Sept. 16, 1958 W. R. RICHARD, JR., ET AL 2,852,501
POLYMERIZATION OF ETHYLENE
Filed Oct. 5, 1954 6 Sheets-Sheet 1

INVENTORS
W. R. RICHARD
R. K. STEWART
J. D. CALFEE
BY
John D. Upham
ATTORNEY

PRESSURE CHART
FOR PROCESS NOT
USING INVENTION

Sept. 16, 1958   W. R. RICHARD, JR., ET AL   2,852,501
POLYMERIZATION OF ETHYLENE
Filed Oct. 5, 1954   6 Sheets-Sheet 3

TEMPERATURE CHART
FOR PROCESS NOT
USING INVENTION

INVENTORS
W. R. RICHARD
R. K. STEWART
J. D. CALFEE
BY
ATTORNEY

PRESSURE CHART
FOR PROCESS
USING INVENTION

TEMPERATURE CHART
FOR PROCESS USING
INVENTION

CONTINUOUS TEMPERATURE CURVE FOR FIGURE 5 PROCESS

United States Patent Office 2,852,501
Patented Sept. 16, 1958

2,852,501

POLYMERIZATION OF ETHYLENE

William R. Richard, Jr., Robert K. Stewart, and John D. Calfee, Dayton, Ohio, assignors to Monsanto Chemical Company, St. Louis, Mo., a corporation of Delaware Application October 5, 1954, Serial No. 460,416

12 Claims. (Cl. 260—94.9)

This invention relates to the polymerization of ethylene to produce normally solid high molecular weight thermoplastic polymers generally known as polyethylene. The invention provides methods for controlling the highly exothermic polymerization of ethylene as carried out continuously in a tubular reactor. In some aspects the invention pertains to the control of ethylene polymerization effected in the presence of small quantities, e. g., less than 200 parts per million, free oxygen as catalyst.

Polyethylene is an exceptionally important material of commerce. This thermoplastic normally solid material, which melts at temperatures generally above 110° C. and shows, by X-ray diffraction analysis, the presence of a crystalline phase, is essentially a linear polymer of ethylene of high molecular weight, usually 15,000 to 40,000 or higher, with controlled and limited branching and cross-linking of the polymer chains. Polyethylene has exceptional insulating qualities in electrical applications, and finds important use in such fields, especially where high frequency currents are involved, as in radar. Because of its flexibility at ordinary temperatures and its wide transition range, polyethylene is used in the molding of a large number of articles such as toys, kitchen utensils and the like. Polyethylene may have a tensile strength of 2,000 p. s. i. or higher and a tensile elongation of 300 percent or higher. Large quantities of polyethylene film are used for packaging. Polyethylene can be modified in properties somewhat by use of comonomers, e. g., vinyl acetate, vinyl chloride, polyhaloethylenes, along with the ethylene being polymerized.

Polyethylene is most effectively produced by subjecting ethylene to the polymerizing action of elevated temperatures while maintained at relatively high pressures, usually at least 5,000 pounds per square inch and often above 20,000 pounds per square inch. The ethylene polymerization reaction is comparatively slow in the absence of catalyst. Organic and inorganic peroxy-type catalysts, e. g., benzoyl peroxide, cumene hydro-peroxide, potassium persulfate, or azo-type, e. g., azo-bis(isobutyronitrile), and various other free-radical promoting catalysts, can be used. One of the simplest and most effective catalysts is free oxygen. Thus, a mixture of ethylene containing a small quantity of free oxygen, such as less than 500 parts per million oxygen, when subjected to temperatures of 200 to 300° C. at pressures of from 20,000 to 40,000 pounds per square inch undergoes polymerization to form polyethylene. The conversions will depend upon the reaction time, but may range from 5 to 25 percent and perhaps even higher. See Fawcett et al. U. S. Patent 2,153,553, directed broadly to polyethylene, Perrin et al. U. S. Patent 2,188,465, directed to use of oxygen as catalyst for making polyethylene, Perrin et al. U. S. Patent 2,200,429, directed to polymerization of ethylene with comonomers.

The polymerization of ethylene is highly exothermic. In order to produce a commercially valuable polyethylene product at a reasonable rate, it is often desirable to effect the ethylene polymerization at reaction conditions that provide a rapid polymerization and that are only slightly less severe than those causing an uncontrolled polymerization in the nature of an explosion resulting in decomposition of ethylene and polyethylene and often formation of free carbon in the reactor. In order to obtain practical reaction rates and production rates, the ethylene-oxygen mixture can be passed continuously through an elongated tube. Considerations of heat transfer, taken in conjunction with the fact that the polymerization reaction is highly exothermic and must be carefully controlled, make it desirable that the reaction tube be of comparatively small diameter, and this is especially so when the conversion per pass is fairly high. As a result the ratio of the length of the reaction tube to the internal diameter of the reaction tube is desirably quite high, for example at least about 300:1 to 500:1, and often on up to 1000:1 and higher. For purposes of heat removal and reaction control, the polymerization reaction tube should be surrounded by a fluid, preferably liquid, heat exchange medium, e. g., liquid diphenyl oxide, diphenyl, chlorinated polyphenyls, hydrocarbon oil, liquid water, steam, air, cooled combustion gases, or the like, circulated at a rate adequate to obtain the desired preheating of the ethylene up to the polymerization temperature and the desired heat removal during the polymerization. Of course, preheating can be done in a vessel or tube separate from the reactor, but as a practical matter it is essential that the preheater and reactor provide in essence a single contiuous flow path.

The quality of polyethylene product with respect to molecular weight, flow characteristics and other properties is dependent on a number of the reaction variables, including pressure, temperature, and oxygen content where oxygen is used as catalyst. The polymerization is effected at conditions chosen to provide certain desired properties in the polyethylene product. Of course, these properties and the values thereof will be dependent to a great extent on the particular use for which the polyethylene is intended. By way of example, however, one of the important properties is the melt index, a measure of the flow rate of the polymer as determined by an extrusion plastometer, test method ASTM D–1238. As reported in decigrams polymer per minute, the melt index will range from 0.5 to 5 for most purposes.

One practical method of conducting the polymerization reaction and obtaining product meeting the usual commercial standards involves maintaining reaction conditions such that the system is almost "on the verge" of an explosion. By "explosion" is meant an extremely rapid highly exothermic degradation, ranging in severity from discoloration of the polymer product up to essentially complete carbonization of ethylene and polymer. Under such circumstances, exceedingly close control is required. However, in practice it is found that the operation of the reactor may be "lined out" for perhaps a number of hours, and the process has apparently reached steady state conditions, when without apparent reason an uncontrollable explosive polymerization rates occurs with a sharp increase in temperature and formation of elemental carbon in the reactor and process stream. This results in a very serious loss of production, and also contaminates the product which is being collected. For these reasons, it is necessary to reduce the severity of the reaction conditions somewhat below those that might be desired in order to obtain maximum conversion and/or optimum properties in the finished product, so as to reduce the frequency of occurrence of these explosions. Thus, any one or all of the conditions, temperature, pressure and oxygen content will be maintained at a lower value than might be possible if this problem did not exist. However, even this procedure of operating at milder reaction conditions does not necessarily assure continuous trouble-free operation, because lower temperature or lower oxygen content tend to make a tougher polyethylene product. Such tougher product serves to accentuate the problem of polymer flow through the reaction tube.

It has been found difficult to operate the polyethylene process continuously at conditions making good product, without serious fluctuations in pressure occurring from time to time. Corresponding temperature fluctuations also occur, the reaction temperature being partly related to and dependent upon the reaction pressure. The pressure fluctuations usually take the form of a greatly increased pressure drop across the first portions of the reaction tube, i. e., in the portions of the reaction tube nearest the ethylene inlet, followed sooner or later by a very sudden decrease in this pressure drop followed immediately by a sharp increase in reaction temperature. This can only be explained at the present time by the theory that polymer product accumulates on the walls of the reactor, causing channeling of the flowing reaction mixture and partial or complete plugging or bridging over of the entire reaction tube with polymer. This plug or bridge or other polymer accumulation then is usually torn loose after a period of time. This results in a rapid increase in pressure downstream of the plug, which increase in pressure and in-flow of fresh ethylene plus catalyst results in a corresponding increase in reaction rate. Removal of accumulated polymer also increases residence time and therefore increases conversion with consequent increased liberation of heat. If the polymer accumulation is sufficiently severe and the tearing away of polymer sufficiently great and rapid, the reaction temperature rises to carbonizing levels and an "explosion" results. This process of bridging and then tearing away may continue irregularly for a considerable period of time. However, the reaction temperature during periods other than those of sharp temperature rise, is less than desirable. Further, these violent fluctuations in flow and pressure drop and consequently reaction temperature, resulting in decreased reaction rate followed by dangerously sharp increase in reaction rate, are not merely a short term recurring phenomenon, but also result in a long term decrease in reaction rate, apparently caused by incomplete tearing away of the polymer from the walls of the reaction tube so that the pressure drop even under apparently steady state conditions is greater than desirable, and the reaction temperature and consequently percentage conversion is too low.

Briefly, then, plugging in the forepart of the reactor with consequent high pressure drop across that portion of the reactor and thus somewhat lowered pressure downstream, corresponds to minimum reaction temperatures. Then, after adhered polymer is torn loose due to the pressure gradient, there is a rapid pressure recovery and increase in proportion of the volume of the tube available for reaction, which is followed immediately by a sharp temperature rise to dangerous levels. Pressure fluctuations and the resulting temperature cycling continue to occur at odd intervals until the temperature rise is great enough to cause carbonization. Furthermore, polymer deposits in the first section of the reactor tube slowly increase during the course of the run, despite the comparatively frequent break throughs which follow plug formation. This is demonstrated by a gradual decrease in heat transfer, especially in the foresection, and results in lowering average temperature of reaction mixture flowing from the front section to the latter sections of the reaction tube. Accordingly, reaction rate in the latter part of the reaction tube is less than desired, both because of poor heat transfer in the first section of the tube where ethylene is being brought up to reaction temperature and also because of lower pressure in the latter section of the tube.

It would seem that every effort should be made to assure highly constant and regular reaction conditions so as to obviate the unevenness of the reaction. However, it has surprisingly been found in accordance with the present invention that by deliberately imposing on the flowing reaction mixture marked flow pulses at regular time intervals, the severe difficulties described hereinabove are overcome. Although we do not wish to be limited by any particular theory, it is believed the regular and externally imposed flow pulses accomplish a regular tearing away of accumulated polymer from the reactor walls to a sufficient extent to avoid approach to plugging or bridging conditions which would, in the absence of the invention, cause the aforementioned irregular changes in the reaction conditions. It is also believed that prompt and regular initiation of reaction in the incoming ethylene plus catalyst is effected by the flow pulses.

As a result of the practice of the invention, many advantages are realized. Thus, the average temperatures in the reactor are higher and are less erratic. Although temperature at any given point in the reaction tube may undergo variation as the process proceeds, these variations tend to be small and constitute a regular repeating cycle directly related to the cycle of the imposed flow pulses and consistently regular temperature patterns are observed. Actual plugging of the reactor is obviated, channeling of reaction mixture, especially through the early portions of the reaction tube, is minimized, heat transfer is much improved, pressure drop is lowered, and as a result of these various factors the per pass percentage conversion of ethylene to polymer is increased. Further, a consistent type and quality of polyethylene product is obtained over extended periods of time.

Briefly stated, in a process for effecting the polymerization of ethylene at high pressures to form normally solid polyethylene, wherein ethylene is continuously forced through a small diameter highly elongated tube maintained at reaction conditions effective to produce a final reaction mixture of polyethylene plus unreacted ethylene exiting from the tube, the present invention involves imposing on the flowing reaction mixture marked flow pulses of such frequency and magnitude as to prevent irregular changes in pressure drop and flow rate originating in the tube from causes other than said pulses and assuring prolonged continuous operation of the process with consistently regular temperature patterns along said tube.

The frequency of the pulses, the duration of the various phases of a single cycle, and the magnitude of the pulses, will of course be somewhat different for various reaction systems and conditions, but will be chosen by a suitable series of tests to prevent irregular changes in pressure drop and flow rate resulting from accumulations of polymer. In most cases the frequency should be at least once every two minutes, and much preferably once every fraction of a minute, such as once every 45 seconds to once every second. Once every few seconds, say once every 3 to 10 seconds, is often a desirable frequency. For each flow pulse, the increased velocity of the reaction mixture through the tube should be from 2 to 10 or more times the standard operating velocity. It is much preferred that the flow pulses be accompanied by corresponding pressure pulses, in which case they can be designated pressure-flow pulses, and the magnitude can be measured by the increase in velocity as just mentioned and/or the change in pressure (as measured at the inlet end of the reactor tube) for each such pressure-flow pulse should be from 5 to 25 percent of the standard operating pressure.

Choice of reaction conditions will of course depend on the particular reactor system employed, adequacy of heat-transfer in the system, purity of ethylene feed, and especially upon the qualities desired in the finished product. Pressure should be at least 5,000 pounds per square inch (p. s. i.), and preferably from 30,000 to 50,000 p. s. i. and even on up to 200,000 p. s. i. and higher. Temperatures should be above 200° C., and preferably from 250 to 300° C. but in all cases limited to avoid carbonization. Oxygen concentration, expressed as parts oxygen by weight per million parts ethylene by weight (p. p. m.), should be below 500 p. p. m., and preferably below 100 p. p. m. and even as low as 5 to 20 p. p. m. If other types of catalyst, such as peroxy- or azo-type, are used, the quantities should be about the same, or somewhat higher. Per pass conversion of ethylene to polyethylene should range from 10 to 30 percent or higher, and preferably from 15 to 25 percent. Ethylene purity should range from 75 to 100 percent, preferably from 90 to 100 percent, with the impurities preferably constituting largely methane and ethane and substantially free from acetylene and carbon monoxide.

In the preferred practice of the invention, pressure-flow pulses are obtained by operation of the "let-down" valve at the exit end of the reaction tube. It may be mentioned here that the usual flow system involves compressors, pumps, and/or intensifiers for bringing the ethylene reactant up to the exceedingly high reaction pressure, means for thoroughly mixing with the ethylene a chosen quantity of catalyst, preferably a very small but carefully controlled percentage of oxygen, means for passing the mixture of ethylene and catalyst into the tubular reactor proper, a preheater first being used and/or the forepart of the reaction tube being used as preheater, and a let-down valve at the exit end of the reaction tube through which the final reaction mixture of ethylene plus polymer flows into a lower pressure polymer separation zone. The pressure on the final reaction mixture may be and preferably is dropped very severely at this outlet valve, for example from a standard reaction pressure of 30,000 to 50,000 pounds per square inch in the reaction tube down to a pressure say 500 to 5,000 pounds per square inch in the separation zone. The reaction mixture on which the pressure has thus been sharply decreased enters a separation zone which effects separation of unreacted ethylene from polymer. The separation zone preferably is maintained at a temperature above the melting point of the polymer so that a pool of molten polyethylene collects in the bottom of the zone. Such molten polyethylene product is then conveniently recovered by extrusion through a valve into a still lower pressure zone maintained, for example, at atmospheric pressure. Unreacted ethylene is withdrawn from the separation zone, and may be recycled, sent to purification, and/or used in other ways. In any event, as indicated above, the present invention is advantageously effected by suitable manipulation of the let-down valve. One skilled in the art, having had the benefit of the present disclosure, will readily be able to devise various methods of operating this valve to impose the desired pressure-flow pulses on the reaction system. In all cases where the invention is practiced by let-down valve operation, the valve will be sharply opened so as to cause a very rapid drop in pressure in the reaction tube. This of course results in a corresponding increase in the pressure drop across those portions of the tube in which flow is most restricted by polymer accumulation and an increase in flow rate of reaction mixture through said portions and for that matter through all portions of the tube. The total pressure is allowed to drop to the chosen extent, which may for example be a drop amounting to ten percent of the total pressure; for example, with a polyethylene process operating at 30,000 p. s. i., the pressure may be approximately instantaneously dropped to 27,000 p. s. i. After this occurs, the valve is then immediately closed, partially or completely. In most instances it is desired to close the valve completely and maintain it in the closed position until the pressure in the reaction tube builds back to the former pressure, which is the standard operating pressure of the process, i. e., 30,000 pounds in the example cited. Alternatively, the let-down valve instead of being closed completely after the sudden pressure drop has been caused by its being opened wide, can be only partially closed with a resultant somewhat slower rate of increase in pressure back to the standard operating pressure. The cycle can be considered completed at the instant the standard operating pressure is attained, and the cycle then immediately repeated by again opening the valve. Or the process can be operated for a shore period of time at the standard operating pressure; after said short period of time, the cycle is considered completed and the let-down valve is again opened as before, starting a new cycle. The procedure described is continued indefinitely. The time elapsing from a given portion of the cycle to the same portion of the next cycle is, of course, termed the frequency of the cyclic operation. The magnitude of the pressure-flow pulse can be measured either by the extent of pressure decrease effected at the beginning of each cycle, or by the increase in flow rate effected at the beginning of each cycle; these values of course are interrelated. The duration of the maximum opening of the let-down valve will be only sufficient to obtain the desired drop in pressure and increase in velocity, while the duration of the period during which the valve is closed or partially closed and of the later period, if any, during which operation is at the standard operating pressure will be dependent upon the temperature response of the flowing ethylene reaction mixture and the frequency required of the cyclic operation to obtain consistently regular, though cyclic, operation over an extended period of time.

The preferred method of effecting the invention has been described, whereby the desired pressure-flow pulses are imposed by cyclic operation of the let-down valve. Less preferably, somewhat similar pulses can be imposed by maintaining a steady outlet flow from the reaction tube and varying the inlet flow conditions, as by suitable manipulation of the pumps that charge the reaction mixture into the tube. Of course, in operating a chemical process it is customary to provide as steady a flow as possible and where a material is continuously pumped at high pressures every effort is made to assure surgeless pumping by suitable use of a plurality of pumps and their proper correlation. Minor surges or pulses resulting from such normal operations are comparatively insignificant and of course do not accomplish the objectives of this invention. If, instead of the outlet valve manipulation, the pressure-flow pulses are to be imposed by variations in pressure and flow at the inlet, adequate pumping capacity must be available to effect a substantially instantaneous increase of pressure in the reaction zone of the order of 5 to 25 percent as described hereinbefore. The "standard operating pressure" will be taken as the maximum pressure attained in this type of operation for the purposes of the present discussion.

By way of example, while maintaining either constant mass flow through the let-down valve or at least a constant opening of the let-down valve so that the rate of flow therethrough varies only as affected by changes in pressure, at the end of a cycle the reactants may be at 27,000 pounds per square inch pressure. Now the cycle is begun by a very rapid forcing of ethylene plus catalyst into the inlet of the reaction tube by means of pump or intensifier until the standard operating pressure of 30,000 pounds per square inch is attained. This is accomplished in a very short period of time, preferably a fraction of a second. There results the desired pressure-flow pulse. The flow of ethylene plus catalyst into the inlet of the reaction tube is then either cut off, or continued only at a rate which will maintain the 30,000 p. s. i. standard operating pressure for a short period of time. The inlet flow is then definitely cut off or at least sharply curtailed and the pressure in the reaction tube allowed to drop in a gradual manner, i. e., in a period usually extending over at least a few seconds, to the value of 27,000 pounds per square inch. At that point the cycle is completed and the next cycle begun by again imposing the pressure-flow pulse by means of a heavy surge of reactants from the pump. The cycle is repeated at regular timed intervals.

The remarks given hereinabove with respect to frequency, magnitude, and duration of the various phases of the cycle, are likewise applicable to this method of operation. The desired results may be obtained either by start-stop operation of the pump or pumps, or by steady operation of the pump with start-stop and modulating action of an inlet valve, or by any combination of these or other suitable mechanical means. By way of example, using two intensifiers which bring compressed ethylene containing admixed oxygen catalyst up from a pressure of say, 20,000 pounds per square inch to a maximum pressure of 30,000 pounds per square inch, the initial pulse can be imparted by one intensifier being brought into operation at the beginning of the cycle. Then during the period that no pulse is being imposed this intensifier can be on suction while the other intensifier is effecting initial compression of ethylene from the 20,000 pounds per square inch at which it is introduced into the intensifiers. By suitable timing the second intensifier is ready to impose the desired pulse at the beginning of the next cycle, and this alternate action is continued. Those skilled in the art will understand that suitable check values, manifolding and timing will be required to integrate properly the actions of two or more intensifiers.

It may be pointed out that while the use of pumps or intensifiers to impose the pressure-flow pulses, rather than use of a let-down valve, gives an operation which in many ways is similar to that obtained by operation of the let-down valve in the manner described hereinbefore, a fundamental difference exists in that the pressure within the entire reaction tube is increasing during the pressure-flow pulse imposed by pumps, whereas it is decreasing during the pressure-flow pulse imposed by opening of the let-down valve. The latter is the preferred operation, and it is believed possible that some of the advantageous results of the invention are enhanced by an expansion of ethylene dissolved in ethylene polymer accumulated on the walls of the reaction tube which expansion aids in the desired polymer removal.

The invention in its broadest aspects can be practiced in still another manner, whereby flow pulses are accomplished without substantial change of reaction pressure. This can be effected for example, by coordination of pumping with let-down valve venting so that the let-down valve is opened and rate of ethylene inlet is increased simultaneously to avoid a change in reaction pressure while causing a flow pulse by a two-fold to 10-fold or greater increase in velocity through the reaction tube. This is followed by throttling the let-down valve and simultaneously and correspondingly slowing the ethylene inlet thus avoiding a change in reaction pressure during this portion of the cycle. Comments given hereinabove with respect to frequency of the pulse cycles apply here also.

In the accompanying drawings:

in Figure 5 the temperature record was obtained by an instrument that recorded periodically, while Figure 6 is a continuous temperature trace.

Figure 1:
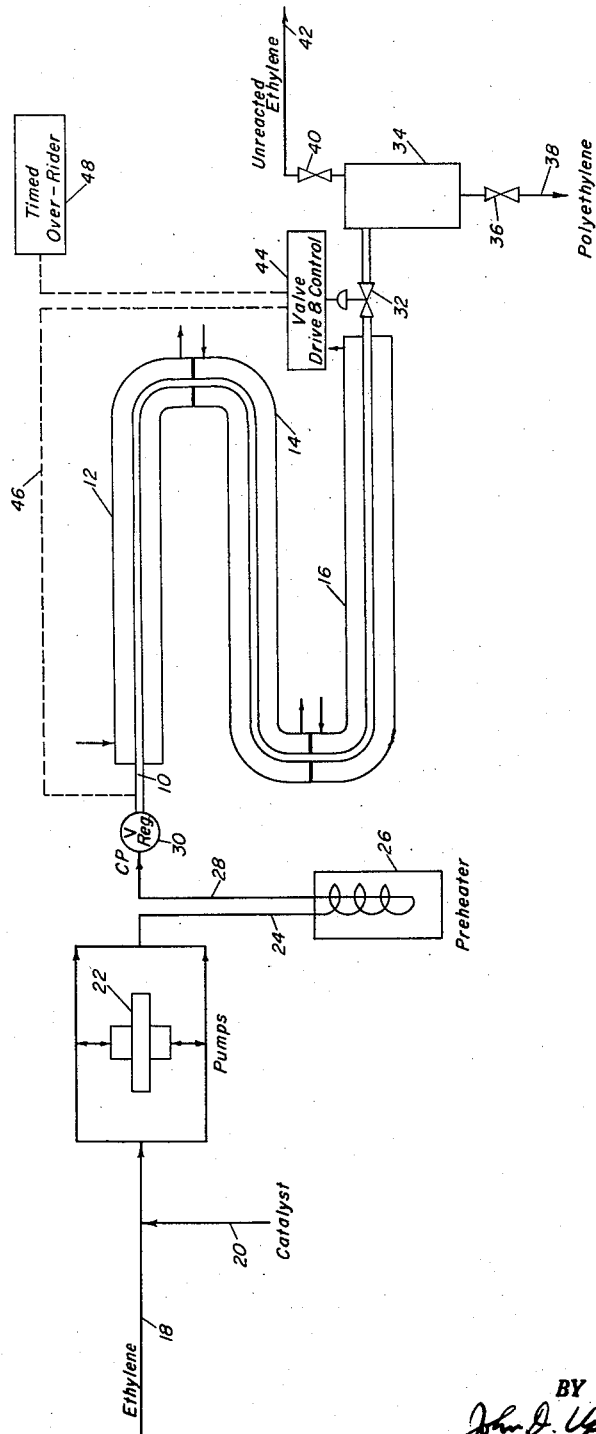
Figure 1 illustrates diagrammatically one suitable apparatus for practicing the invention.

It will be appreciated that many changes in form and construction, from the exact details shown in Figure 1, can be made without departing from the invention. The drawing is diagrammatic in form and those skilled in the art will understand the numerous apparatus elements such as compressors, valves, coolers, condensers, controls and the like that will be necessary.

Referring first to Figure 1, a polymerization reaction tube is designated by the reference numeral 10. This tube is shown in convolute form, but it is not outside the scope of the invention to have the tube in other form, such as straight. A vertical position of the tube assists polymer flow. It will be appreciated that this is high pressure equipment and suitable steels and construction methods must be used. The reaction tube 10 is shown enclosed in three successive jackets through each of which heat exchange fluid is passed by means of the inlets and outlets shown. The first jacket designated by the numeral 12, the second jacket designated by the numeral 14, and third jacket designated by the numeral 16, can be taken as arbitrarily establishing three successive zones of the reactor. Customarily, the heat exchange fluid passed through jacket 12 is hotter than the ethylene entering reaction tube 10, while the heat exchange fluid passed through jackets 14 and 16 is cooler than the reaction mixture within the corresponding zones of reaction tube 10 so that exothermic heat of reaction is removed.

Purified ethylene, with from zero to say 15 or even up to 30 percent of a co-monomer, is withdrawn from any suitable source via line 18, into which is introduced the correct quantity of catalyst, preferably a small quantity such as 5 to 50 parts per million of pure molecular oxygen, via line 20. The mixture of ethylene and catalyst is then brought to reaction pressure by any suitable means, which will often involve a preliminary compression prior to introduction of the catalyst, the final increase to reaction pressure being accomplished preferably by means of intensifiers indicated diagrammatically by the reference numeral 22. These may involve, for example, two or more cylinders 180 degrees out of phase with respect to suction and compression effected by means of pistons therein. The thus pressured ethylene plus oxygen is then passed by means of line 24 to preheater 26 where it is increased in temperature, for example up to 75 to 150° C. The reaction mixture is then passed via line 28 through a regulating valve 30 to the inlet of the reaction tube 10. Valve 30 is suitably constructed and its operation correlated with the operation of intensifiers 22, so as to maintain reasonably a constant pressure of reaction mixture entering the valve. This constant pressure is sufficient to overcome the pressure drop across the valve and still provide the standard operating pressure within the reaction tube 10 during those portions of the cycle in which the let-down valve 32 is closed or is modulated to maintain said standard operating pressure. Alternative methods for obtaining delivery of reaction mixture to the inlet of reactor tube 10 at desired rate and pressure are of course available, such as dispensing with valve 30 and merely regulating the speed of the pumps 22 to provide a constant mass flow rate.

Let-down valve 32 is provided at the exit end of reactor tube 10 for dropping the pressure of the final reaction mixture of unreacted ethylene and ethylene polymer and controlling their flow into separator 34. A separation of polymer from ethylene occurs in separator 34, which preferably is maintained at a temperature above the melting point of polymer so that a pool of molten polyethylene product is recovered by extrusion through valve 36 and line 38. Separator 34 is shown diagrammatically, and may be of any suitable construction. It will be understood that the drawing is not to scale and that separator 34 should be sufficiently large to hold an appreciable quantity of the molten polyethylene. Separated ethylene is recovered through valve 40 and line 42.

Let-down valve 32 can be manually operated. However, for commercial porduction over extended periods of time, the valve should be automatically driven and controlled by suitable means indicated diagrammatically at 44. While the various mechanical and electrical arrangements that can be used to accomplish the desired cyclic operation of let-down valve 32 are numerous, and can be chosen by those skilled in the art having had the benefit of the present disclosure, one simple and preferred arrangement is shown schematically in Figure 1 wherein operation of valve 32 is actuated in response to the pressure at the inlet end of reaction tube 10 by a suitable electrical or pneumatic control line 46. The valve operating mechanism 44 is set to maintain a constant pressure at the pressure control point at the inlet end of reactor tube 10, within very close limits. In other words, as the pressure at the pressure control point rises above the predetermined and preset standard operating pressure, the valve 32 automatically opens slightly, thus avoiding any further pressure rise and permitting the pressure to drop slightly. As soon as the pressure at the pressure control point drops below the standard operating pressure, valve 32 automatically closes a small amount sufficient to return the pressure to the pre-selected value. This modulating action is well known to those skilled in the art. By way of example, an operating pressure of 30,000 pounds per square inch may be preselected, and the system may be of sufficient sensitivity to maintain this pressure within plus or minus 100 pounds per square inch.

Now in accordance with this particular method for effecting the invention, the control of driving means 44 for let-down valve 32 in response to pressure signals carried by line 46, is subject to being overridden by a timer 48. The timer is set to override or prevent, at the beginning of the cycle, the response of motor 44 to the pressure indication coming via line 46, and causes let-down valve 32 to be opened wide. At the end of the pre-set period of time, which is usually less than one second, timer 48 causes valve 32 to be immediately closed, or at least turn to a throttled position. Valve 32 is maintained thus until the pressure within the reaction system has been built back up to standard operating pressure. The timing system may be such that a new cycle is then immediately begun with another opening of valve 32 to give a sudden pressure drop and pressure-flow pulse, or the cycle may not be concluded at this point but rather normal operation of the let-down valve permitted for a short period of time before the end of the cycle. If the latter is the case, as soon as standard operating pressure has been reached at the pressure control point, line 46 carries the message to motor 44 which begins modulating valve 32 to maintain the standard operating pressure and this continues until the timer causes the cycle to begin again.

While the pressure point has been indicated at the inlet of reaction tube 10, any other pressure point can be chosen, for example a point immediately before the let-down valve 32, in other words at the end of reactor tube 10 just before the pressure is decreased at valve 32. In view of the high length to cross sectional area ratio of the reactor tube 10, it will be apparent that at a given time the pressure will be different at various points along the reactor tube 10, and that the pressure will be higher at the inlet and become lower as the reaction mixture flows along through the reactor tube towards the outlet end at valve 32. It has been found that most of the plugging and bridging-over trouble discussed hereinabove, the effect of which the present invention is designed to obviate, occurs in the initial portion of the reaction tube, i. e., that portion surrounded by jacket 12. In view of this, and the fact that the pressure just before the let-down valve 32 undergoes greater fluctuations than at the inlet of the reactor tube, it is generally preferred that the pressure control point for the normal operation of valve 32 be established near the inlet of reactor tube 10. However, the change in pressure caused by the practice of the invention will vary from point to point along the reactor tube. Thus, for example, if the pressure-flow pulses are effected by manipulation of let-down valve 32, it is obvious that the maximum drop in pressure will occur immediately before that valve, and the minimum drop in pressure will occur at the inlet of reactor tube 10. The values given herein of 5 to 25 percent drop in pressure to be effected at the beginning of each cycle, is based on pressure changes at the inlet to the reaction tube. If the pressure changes are actually being measured at a different point along reaction tube 10, correspondingly larger decreases in pressure are encountered.

It is sometimes desirable to provide substantial surge capacity between the pumps and the point at which reaction mixture first attains polymerization temperature. For example, in Figure 1 if valve 30 is eliminated and pumps 22 are operated at constant mass output, preheater 26 provides such surge capacity, or similar tubing can be used without preheating other than in the first part of the reactor tube 10 which is surrounded by jacket 12. The surge capacity permits much greater velocity increases, on opening let-down valve 32, for a given decrease in pressure on the reaction system. The volume of the surge section can, for example, range from 0 to 5 times the volume of the reactor tube 10. However, if the pressure-flow pulses are imposed at the inlet of reactor tube 10 by pump action as described hereinbefore, rather than by operation of the let-down valve, such surge capacity is not desirable as it reduces, rather than increases, the severity of the pulses.

Figure 2:
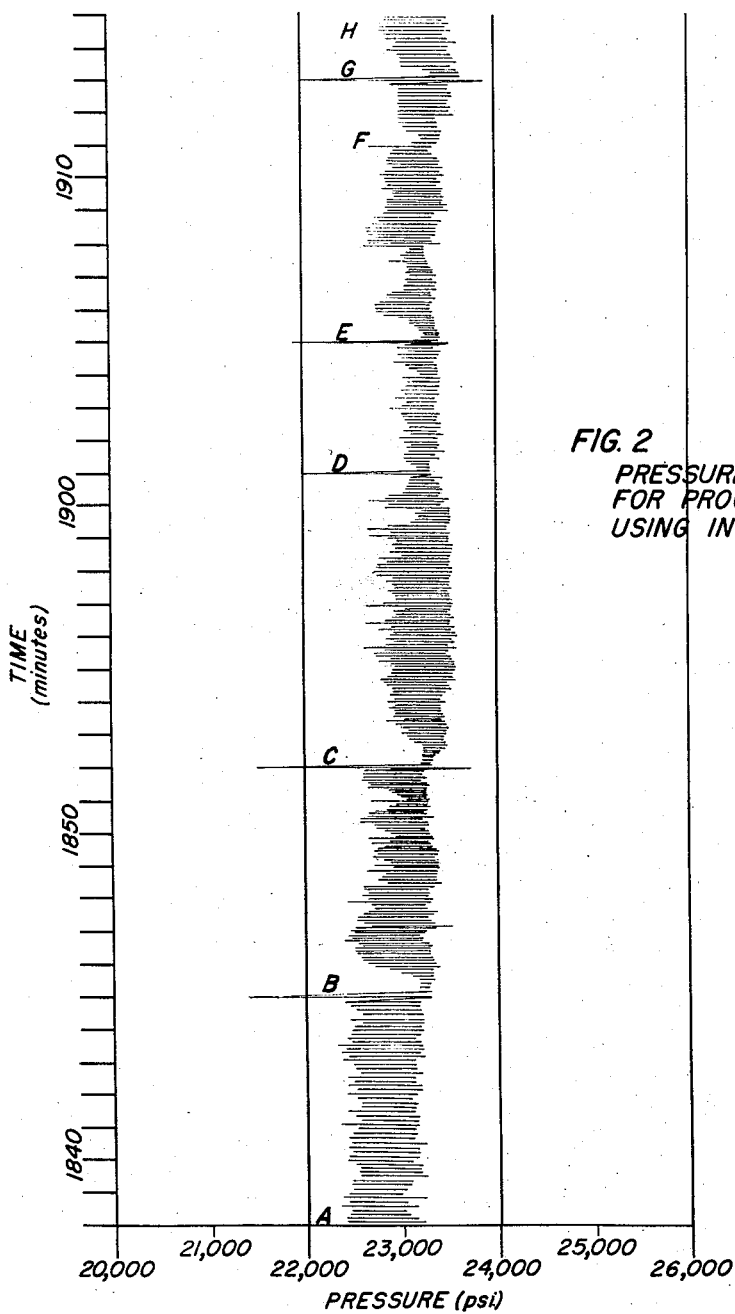
Figure 2 is a plot of pressure against time, for an ethylene polymerization effected in the absence of this invention.
Figure 3:
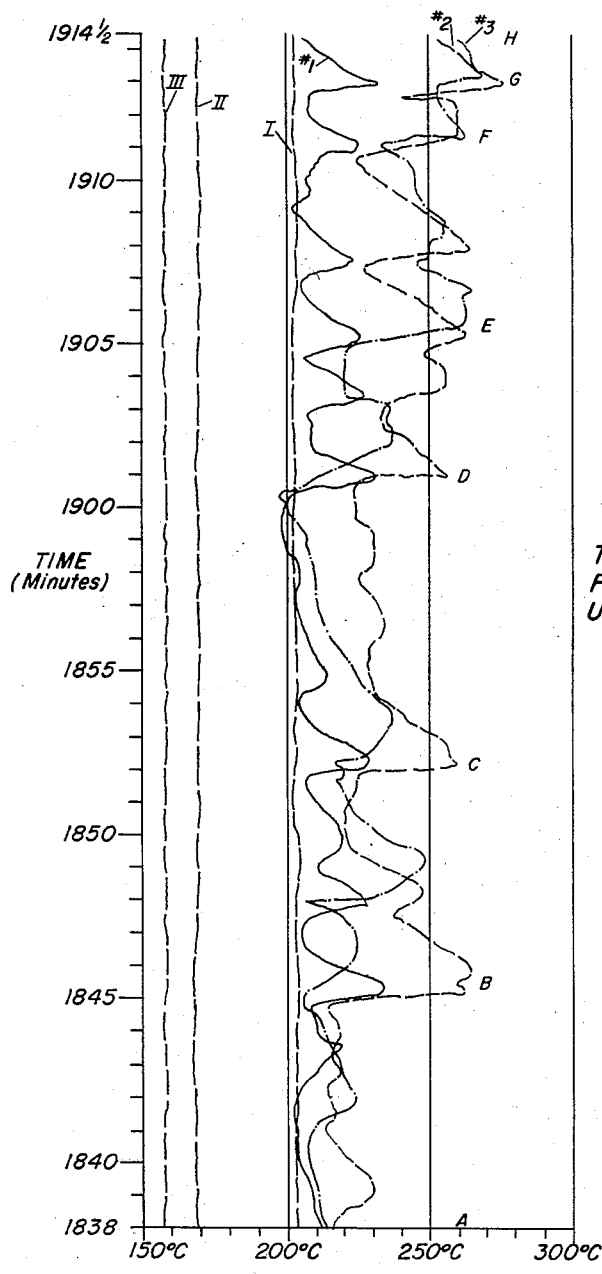
Figure 3 is a plot of temperature against time for the same ethylene polymerization whose pressure is given in Figure 2.

Turning now to Figures 2 and 3 of the drawings, these should be examined together. They respectively represent a pressure record, and a temperature record, for a portion of a continuous polyethylene-producing process effected without use of the present invention. The process was effected by continuously passing ethylene containing oxygen as catalyst through a highly elongated tube at the conditions indicated by Figures 2 and 3. Successive portions of the tube were surrounded by separate heat exchange jackets. In Figure 3, trace line I is the reading of the thermocouple which measured the inlet temperature of the heat exchange fluid flowing around the first portion of the reaction tube. By first portion is meant the portion into which the ethylene-plus-oxygen feed was introduced. Similarly, in Figure 3, line II is the reading of the thermocouple measuring the inlet temperature of the heat exchange fluid that was continuously circulated around the second portion of the reaction tube, i. e., the portion of the reaction tube downstream (in the direction of the flow of the reaction mixture) of the first portion or zone. Likewise, line III is the thermocouple reading of the inlet temperature of the heat exchange fluid flowing through the jacket around the third portion of the reaction tube, which portion is downstream from the second portion and ends with the let-down valve of the type described hereinbefore. It will be noted that the heat exchange fluid circulated around the first zone of the reactor enters the jacket at a higher temperature than that circulated around the second and third zones of the reactor. This aids in bringing the inlet reaction mixture of ethylene plus oxygen up to polymerization temperature, while the lower temperatures in the second and third zones aid in removing the exothermic heat of polymerization.

Still looking at Figure 3, the lines indicated as #1, #2 and #3, respectively are the tracings of the temperature readings obtained by thermocouples designated as Nos. 1, 2 and 3. Thermocouple No. 1 is located in a thermocouple well within the reaction tube in the first zone of the tube. Thermocouple No. 2 is somewhat downstream of that, and No. 3 is still further downstream, approximately at the middle of the total length of the reactor tube. It may be mentioned that in this run, generally maximum temperatures along the tube are recorded by thermocouple No. 2, and it will be seen that the temperature recorded by thermocouple No. 3 is somewhat lower while temperatures still further downstream recorded by thermocouples whose tracings are not shown on Figure 3 were still lower.

Figure 2 is a reproduction of the trace made by an automatic pressure recorder for the same portion of the same polymerization run for which temperatures are shown in Figure 3. This pressure was detected near the inlet of the polymerization reaction tube. While the pressure recorder gave a continuous line trace on the pressure chart, this has been simplified somewhat in preparing Figure 2 in order to minimize the closeness of the lines which would be required if the trace of the pen in both directions were shown. It will be seen from the short lines that the pressure underwent appreciable change with each stroke of the pump. In preparing Figure 2, the draftsman has shown separate single lines which represent the stroke of the pen in one direction only, deleting the return stroke of the pen in each case to avoid too many lines as aforementioned, with the exception of the trace at points B, C, D, E, F and G, in which the stroke of the pen in both directions has been shown.

The letter "A" in Figures 2 and 3 represents a time of comparatively even operation of the process although the temperature trace from Time "A" to Time "B" undergoes irregular variation. At the Time marked "B," it will be seen that a very large and sudden pressure drop occurred, from the standard operating pressure in the neighborhood of 23,000 lbs. per square inch (p. s. i.) down to 21,400 p. s. i. This was spontaneous within the system and was not caused by any deliberate action or change by the operator with respect to the let-down valve or pumps, and it is interpreted as occurring by virtue of a sudden giving way or displacement of polymer from walls of the reaction tube The trace first goes up in pressure, indicating a block or plug in the tube. The automatic valve then opens wide trying to get rid of the pressure. The sharp drop in pressure then follows. The temperatures indicated by thermocouples 1, 2 and 3 promptly rose very sharply, and it will be seen that the temperature of thermocouple 2 rose from about 210° C. to 260° C. The process proceeded with the gradual lowering of temperatures which, however, still were undergoing considerable fluctuations, until the event marked "C" occurred. It will be noted, however, that in general the temperatures between "B" and "C" as indicated by all the thermocouples were much higher than the temperatures before "B," indicating more reaction occurring within the tube. At "C" another sharp drop in pressure occurred, and again the temperature as indicated by thermocouple No. 2 rose very sharply from about 210° C. to 260° C. The temperature then immediately began to fall off, while the temperature of thermocouple 3 increased somewhat and then all temperatures of thermocouples 1, 2 and 3 gradually drifted downward over the next several minutes. It is interesting to note that the temperature indicated by reaction thermocouple No. 1 dropped below the temperature indicated by heat exchange fluid thermocouple No. 1, indicating a very poor transfer of heat from the heat exchange fluid into the flowing reaction mixture in the first zone of the reaction tube. At "D" (Time 1901) another sharp drop in pressure occurred, with a resulting sharp increase in the temperature recorded by thermocouples 1 and 2 followed shortly by increase in the temperature recorded by thermocouple No. 3. The temperatures underwent wild fluctuation during the 4-minute period ending at Time 1905 (E) when again a sharp pressure drop occurred. This resulted in even greater increase in the reaction temperatures which proceeded to undergo severe fluctuations for the next several minutes. A less severe drop in pressure occurred at "F," resulting, however, in a sharp temperature peaking. At "G" another severe drop in pressure occurred and the temperatures indicated by all three thermocouples increased still more.

The reaction conditions shown by Figures 2 and 3 are typical of the more severe type of problems discussed in the early part of this patent application. These figures are records of an actual process in which polyethylene was produced by the oxygen-catalyzed polymerization of ethylene.

Figure 4:
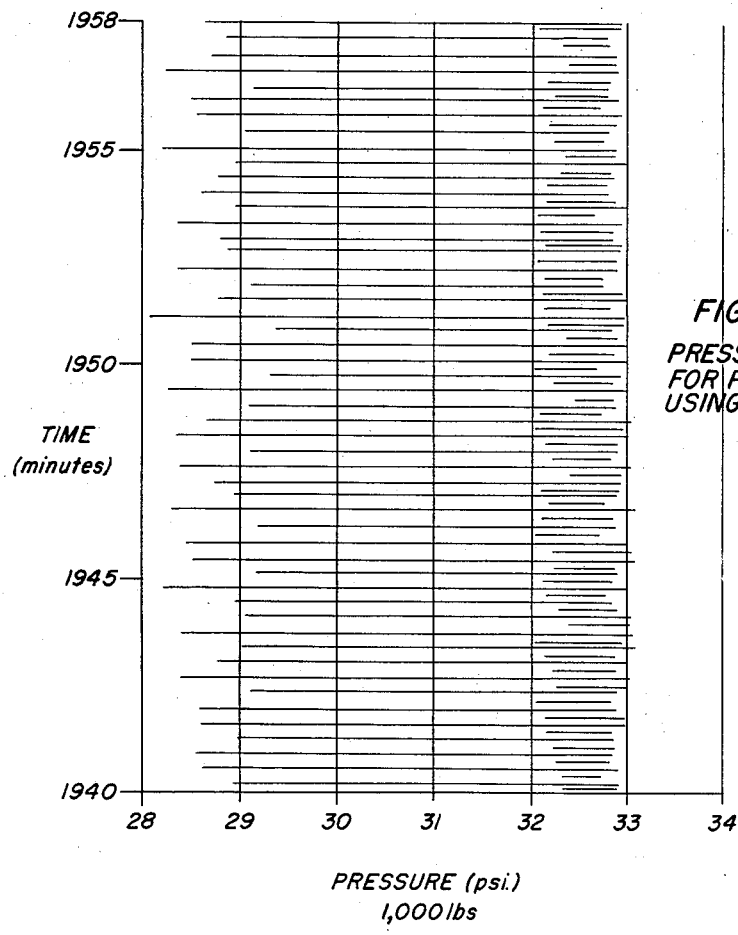
Figure 4 is a plot of pressure against time, for an ethylene polymerization effected while practicing the present invention.
Figure 5:
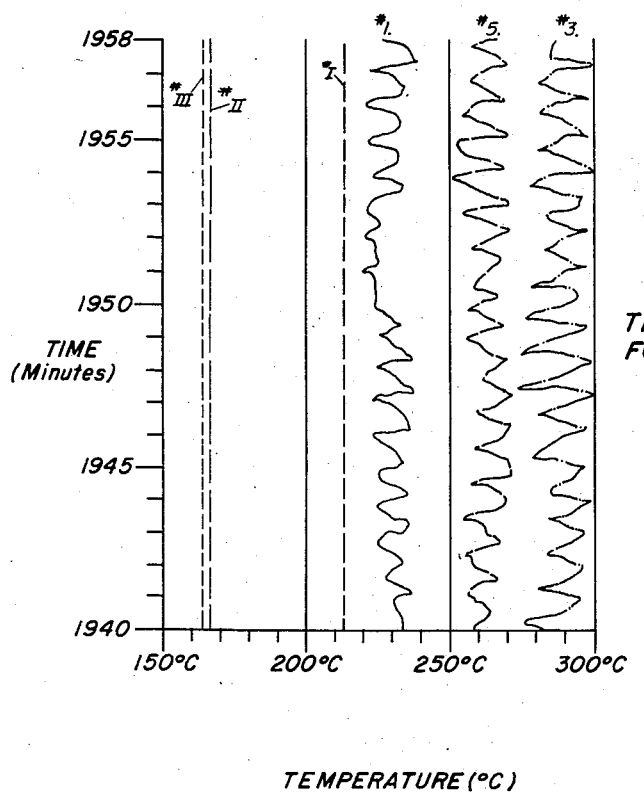
Figure 5 is a plot of temperature against time for the same ethylene polymerization whose pressure is given in Figure 4.

Turning now to Figures 4 and 5, which should be read together, the former is a pressure chart similar to Figure 2, and the latter a temperature chart similar to Figure 3, but for an ethylene polymerization process in which the invention was employed. The process, pressures and temperatures for a small portion of which are shown in Figures 4 and 5, was carried out in the same apparatus employed in the process for which Figures 2 and 3 show a small portion of the pressure and temperature conditions. Although the standard operating pressure for the process of Figures 4 and 5 was just under 33,000 pounds per square inch, whereas the standard operating pressure for the process of Figures 2 and 3 was about 23,000 pounds per square inch, this difference does not affect the general validity of the comparison of the two processes; this statement is based on a great deal of experience with the polyethylene process in general and with the process as run in this particular equipment, and the two processes representing Figures 2 and 3 on the one hand and Figures 4 and 5 on the other hand were chosen from a large series of runs as being typical of the process as run without, and with, the invention.

As in Figure 2, the draftsman in preparing Figure 4, has shown the strokes of the chart pen in only one direction, to avoid having the lines too close together on the drawing. Figure 4 shows that the pressure was dropped severely at regular and frequent intervals. The process instrumentation was such that the let-down valve was modulated in response to the pressure at the inlet of the reaction tube in order to maintain a standard operating pressure at the inlet in the neighborhood of 32,500 pounds per square inch. The short lines in Figure 4 show the results of normal modulation of the valve maintaining pressures around that valve. The let-down valve control was subjected to the action of an override which at timed intervals caused the let-down valve to open wide. This condition was maintained for a time slightly under one second, after which the valve was closed completely and remained closed until the pressure built back up into the normal operating pressure range at which time the normal modulation again started. Very soon thereafter, however, the timer again went into action to repeat the cycle. The frequency of the cycle was about twenty-two seconds, i. e., a pressure-flow pulse was caused to occur within the reaction tube once every 21.2 seconds by the means described. The magnitude of the pulse, as measured by pressure change at the inlet of the reaction tube as shown in Figure 4, as about eleven percent. The pressure drop caused by the wide opening of the let-down valve averaged about 3,500 pounds per square inch. This value, divided by the standard operating pressure of 32,500 pounds per square inch gives a value of approximately 11 percent as a measure of the pulse magnitude.

Results of the imposition of the pressure-flow pulse are readily seen by reference to Figure 5. Here, as in Figure 3, lines I, II, and III represent the inlet temperature of the heat exchange fluid being passed to the first, second, and third zones, respectively. Also, as in Figure 3, the temperature traces shown by #1, #3 and #5, represent the temperatures detected by thermocouples numbered 1, 3 and 5. It will be remembered that in the process shown in Figure 3, the highest temperature was measured by thermocouple number 2. However, in the process employing the invention as shown in Figure 5, the highest temperature was measured by thermocouple number 3; the traces of thermocouples 1, 3 and 5 were therefore used in Figure 5. Figure 5 shows regular temperature patterns for the process. It is also interesting to note that the temperature recorded by thermocouple #1 is well above the temperature (thermocouple I) of the inlet temperature of the heat exchange fluid passed to zone number 1, thus indicating that good heat exchange is occurring within the reaction tube and the polymerization process is being initiated near the inlet. It should be stated that the pressures and temperatures as recorded by Figures 4 and 5 are typical of the pressures and temperatures recorded for many hours in this run.

Figure 6:
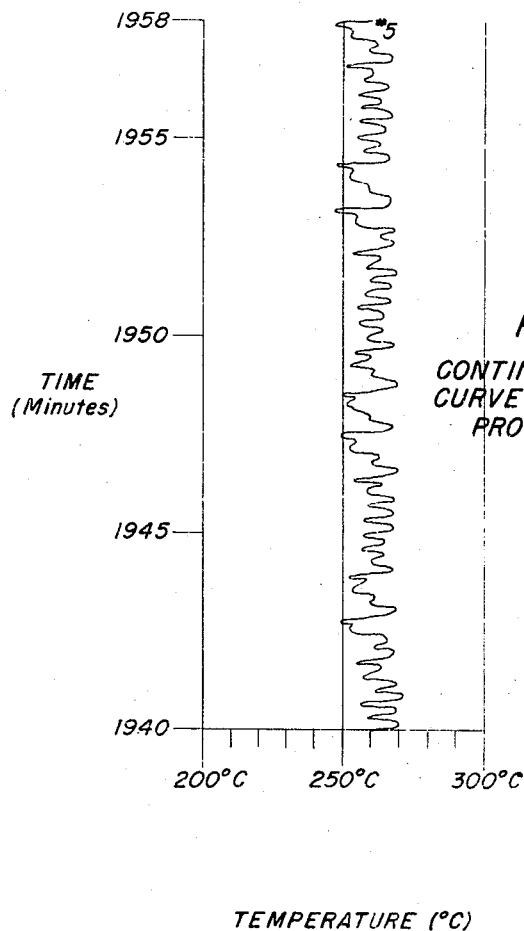
Figure 6 is a more detailed plot of temperature against time for the ethylene polymerization referred to in Figures 4 and 5.

Figure 6 is a continuous record of the temperature detected by thermocouple number 5 in the same run and for the same period of time as shown in Figure 5. The temperature record of Figure 5 was made by a recording instrument which prints periodically rather than regularly. The instrument records a number of temperatures by swiftly switching from one thermocouple to another, so that the record for any given thermocouple is actually a series of dots at closely spaced intervals. In preparing Figures 3 and 5, these dots have been joined into single lines. Because the period of recording for a given thermocouple, in Figure 5, is different from the period between the pressure-flow pulses, apparent frequency of temperature fluctuation as shown in Figure 5 is not the same as the frequency of the flow pulses. However, reference to Figure 6, which is a continuous trace of the temperature detected by thermocouple number 5 over the same period of time, shows the true fluctuation of the temperature with time. Comparison of Figure 6 with Figure 4 shows that there is a temperature fluctuation for each pressure fluctuation. Figure 6 also shows a regular temperature pattern for the process carried out when practicing the invention.

In addition to the foregoing, the following example is given of the results of practicing the invention.

In a small continuous experimental polymerization apparatus, a series of runs was made in which ethylene containing free oxygen was subjected to polymerization to make polyethylene. The let-down valve was controlled manually. In the first ten runs made, irregular and severe pressure drops occurred, temperature control was poor, and most of the runs were terminated by explosions. The products were severely contaminated with carbon black. In the eleventh run, the pressure was deliberately dropped at timed intervals. Procedure was as follows: A standard operating pressure of 25,000 pounds per square inch was used. The let-down valve was rapidly opened by hand and pressure allowed to drop approximately 1,500 pounds per square inch after which the valve was closed. The pressure was then allowed to build back up until it reached the standard operating pressure of 25,000 pounds per square inch, after which a period of 5 seconds was allowed to elapse during which the pressure was maintained at that value by automatic control of the pump. At the end of the 5 seconds the valve was again opened and the cycle repeated. Process conditions were: oxygen content 100 parts per million, dwell time 11 minutes, temperature approximately 240° C. As a result of operating in the manner discussed, process control was good, polyethylene was produced in a conversion of 25 weight percent, and no carbon black was made nor did any explosion occur.

While the invention has been described with particular reference to various preferred embodiments, it will be appreciated that numerous modifications and variations are possible without departing from the invention. Thus, those skilled in the art will of course understand that the frequency and magnitude of the cyclic pulses must in each instance be chosen to fit the particular combination of apparatus and reaction conditions. For instance, magnitudes or frequencies much greater than the optimum for a given set of conditions will either stop the reaction entirely or cause an explosion, while magnitude or frequency too much smaller than optimum will be inadequate to accomplish the objects of the invention. Further, the invention can be applied to the manufacture of the lower molecular weight ethylene polymer waxes, such as those having a molecular weight below 10,000 and no appreciable tensile elongation, although the need for the invention is not ordinarily felt to nearly as great an extent as it is in the manufacture of high molecular weight polyethylene with reference to which the invention has been particularly described.

We claim:

1. In a process for effecting the polymerization of ethylene at high pressures to form normally solid polyethylene, wherein ethylene is continuously pumped through a small diameter highly elongated tube maintained at reaction conditions effective to produce a final reaction mixture of polyethylene plus unreacted ethylene exiting from the tube, the improvement which comprises periodically at regular time intervals substantially instantaneously opening wide the outlet end of said tube to a low pressure to impose on the flowing reaction mixture marked flow pulses of such frequency, at least once every two minutes, and magnitude, and at least two-fold increase in linear velocity of reaction mixture through said tube, as to prevent irregular changes in pressure drop and flow rate originating in the tube from causes other than said pulses and assuring prolonged continuous operation of the process with consistently regular temperature patterns along said tube.

2. A process according to claim 1 wherein the frequency is greater than one pulse per minute.

3. A process according to claim 1 wherein the pulse is accompanied by a 5 to 25 percent decrease in reaction pressure as measured at the inlet of the reaction tube.

4. In a process for effecting the polymerization of ethylene at high pressures to form normally solid polyethylene, wherein ethylene is continuously pumped through a small diameter highly elongated tube maintained at reaction conditions effective to produce a final reaction mixture of polyethylene plus unreacted ethylene exiting from a let-down valve at the end of said tube, the improvement which comprises imposing upon the flowing reaction mixture marked pressure-flow pulses according to the following cycle: open the let-down valve wide for a period of time less than one second and sufficient to cause a 5 to 25 percent decrease in reaction pressure as measured at the inlet of the reaction tube, then closing the let-down valve and maintaining it in closed position until the standard operating pressure is re-established, then modulating the opening of the let-down valve to maintain the standard operating pressure over any period of time remaining until the beginning of the next cycle, and repeating the cycle at a frequency greater than 2 cycles per minute.

5. A process according to claim 1 wherein the polymerization is effected at a standard operating pressure of at least 20,000 pounds per square inch.

6. A process according to claim 4 wherein the polymerization is effected at a standard operating pressure of at least 20,000 pounds per square inch.

7. A process according to claim 1 wherein the polymerization is effected at temperatures above 200° C. but below those causing explosive decomposition.

8. A process according to claim 4 wherein the polymerization is effected at temperatures above 200° C. but below those causing explosive decomposition.

9. A process according to claim 1 wherein the polymerization is effected in the presence of less than 200 parts per million oxygen as catalyst.

10. A process according to claim 4 wherein the polymerization is effected in the presence of less than 200 parts per million oxygen as catalyst.

11. A process according to claim 1 wherein the frequency is greater than two pulses per minute.

12. A process according to claim 1 wherein the frequency is one pulse every 3 to 10 seconds.

References Cited in the file of this patent
UNITED STATES PATENTS
2,511,480    Roedel _____ June 13, 1950

UNITED STATES PATENT OFFICE
CERTIFICATE OF CORRECTION

Patent No. 2,852,501 September 16, 1958

William R. Richard, Jr. et al.

It is hereby certified that error appears in the printed specification of the above numbered patent requiring correction and that the said Letters Patent should read as corrected below.

Column 12, line 53, for "as about" read -- was about --; column 14, line 18, for "and", second occurrence, read -- an --.

Signed and sealed this 13th day of January 1959.

(SEAL)
Attest:

KARL H. AXLINE
Attesting Officer

ROBERT C. WATSON
Commissioner of Patents